US012651361B2

(12) United States Patent
McIntosh

(10) Patent No.: US 12,651,361 B2
(45) Date of Patent: Jun. 9, 2026

(54) METHODS AND APPARATUS FOR AUGMENTING DENSE DEPTH MAPS USING SPARSE DATA

(71) Applicant: GoPro, Inc., San Mateo, CA (US)

(72) Inventor: Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 313 days.

(21) Appl. No.: 18/447,598

(22) Filed: Aug. 10, 2023

(65) Prior Publication Data

US 2025/0054167 A1    Feb. 13, 2025

(51) Int. Cl.
   *G06K 9/00*     (2022.01)
   *G06T 7/50*     (2017.01)
(52) U.S. Cl.
   CPC ...... *G06T 7/50* (2017.01); *G06T 2207/10016* (2013.01); *G06T 2207/10028* (2013.01)
(58) Field of Classification Search
   CPC ............. G06T 7/50; G06T 2207/10016; G06T 2207/10028; G06T 7/55; G06T 7/579
   See application file for complete search history.

(56) References Cited

U.S. PATENT DOCUMENTS 10,964,040 B2 * 3/2021 Sun ........................... G06T 5/50

11,688,073 B2 * 6/2023 Peri ........................... G06T 7/13
                                          345/419
2015/0310620 A1 * 10/2015 Aviv ........................ G06T 7/593
                                          382/154
2018/0288435 A1 * 10/2018 Boyce .................. H04N 19/593
(Continued)

FOREIGN PATENT DOCUMENTS

CN        108062769 B  * 11/2020   ............... G06T 7/50
CN        113256595 A  *  8/2021   ............. G06F 16/29
(Continued)

OTHER PUBLICATIONS

Point Cloud Estimation for 3D Structure-Based Frame Prediction in Video Coding, Hossein Bakhshi Golestani et al., IEEE, 2017, pp. 1267-1272 (Year: 2017).*

(Continued)

*Primary Examiner* — Jayesh A Patel
(74) *Attorney, Agent, or Firm* — Wang Hardoon, P.C.

(57)    ABSTRACT

Systems, apparatus, and methods for augmenting dense depth maps using sparse data. Various embodiments combine single-image depth estimation (SIDE) techniques with structure-from-motion techniques for improved depth accuracy. In some examples, a machine learning (ML) model is used to generate a dense depth map based on one or more frames/images of a video. Structure-from-motion (SfM) analysis is performed on the video to determine depth information from camera movement in the video. The structure-from-motion techniques may generate more accurate data than the ML model, however, the data from the ML model may be denser compared with the SFM depth data. The dense ML model depth map may be augmented by the SFM depth data. Augmentation may include fitting the relative depths determined by the ML model depth map to the absolute depth in the SFM data resulting in more accurate dense depth information.

20 Claims, 9 Drawing Sheets

(56)            References Cited

U.S. PATENT DOCUMENTS

| | | | | |
|---|---|---|---|---|
| 2020/0082554 | A1* | 3/2020 | Wang | G06T 7/521 |
| 2021/0319569 | A1* | 10/2021 | Peri | G06V 10/44 |
| 2021/0358206 | A1* | 11/2021 | Song | G01C 21/005 |
| 2022/0343521 | A1* | 10/2022 | Wofk | G06T 7/50 |
| 2023/0042846 | A1* | 2/2023 | Qin | G06T 7/521 |
| 2023/0230269 | A1* | 7/2023 | Yoo | G06N 3/0442 |
| | | | | 382/106 |
| 2024/0202950 | A1* | 6/2024 | Chen | G06T 7/579 |
| 2024/0296576 | A1* | 9/2024 | Ghafoorian | G06T 7/55 |

FOREIGN PATENT DOCUMENTS

| | | | | | | |
|---|---|---|---|---|---|---|
| CN | | 114072842 | A | * | 2/2022 | G06T 7/593 |
| CN | | 114119701 | A | * | 3/2022 | G06T 3/4007 |
| CN | | 116012449 | A | * | 4/2023 | |
| CN | | 115100360 | B | * | 12/2023 | G06T 17/00 |
| CN | | 112330729 | B | * | 1/2024 | G06T 7/50 |
| KR | | 102030112223 | A | * | 7/2023 | |
| WO | WO-2021013334 | A1 | * | 1/2021 | | G06T 7/50 |
| WO | WO-2022036338 | A2 | * | 2/2022 | | G06T 5/50 |
| WO | WO-2022191373 | A1 | * | 9/2022 | | G06T 17/00 |

OTHER PUBLICATIONS

S2DNet: Depth Estimation From Single Image and Sparse Samples, Praful Hambarde et al., IEEE, 2020, pp. 806-817) (Year: 2020).*

Bhat, Shariq Farooq, et al. "Zoedepth: Zero-shot transfer by combining relative and metric depth." arXiv preprint arXiv:2302.12288 (2023). 20 pages.

Dijk, Tom van, and Guido de Croon. "How do neural networks see depth in single images?." Proceedings of the IEEE/CVF International Conference on Computer Vision. 2019. 8 pages.

Li, Zhengqi, et al. "Learning the depths of moving people by watching frozen people." Proceedings of the IEEE/CVF conference on computer vision and pattern recognition. 2019. 13 pages.

Mertan, Alican, Damien Jade Duff, and Gozde Unal. "Single image depth estimation: An overview." Digital Signal Processing 123 (2022): 103441. 18 pages.

Watson, Jamie, et al. "The temporal opportunist: Self-supervised multi-frame monocular depth." Proceedings of the IEEE/CVF Conference on Computer Vision and Pattern Recognition. 2021. 19 pages.

Zhan, Huangying, et al. "Visual odometry revisited: What should be learnt?. " 2020 IEEE international conference on robotics and automation (ICRA). IEEE, 2020. 8 pages.

* cited by examiner 300        302

400        402        404

600

700

METHODS AND APPARATUS FOR AUGMENTING DENSE DEPTH MAPS USING SPARSE DATA

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital image capture and post-processing. More particularly, the present disclosure relates to systems, computer programs, devices, and methods for augmenting dense depth maps using sparse data.

DESCRIPTION OF RELATED TECHNOLOGY

Knowledge of depth information in a scene in an image or video may be used in various applications. For example, depth maps are used in post-processing to simulate background blur (bokeh) in images or videos. This effect can be seen in portrait photographs, where the subject is in sharp focus while the background is blurred to create visual separation and highlight the main subject. Depth information is used by autonomous ("self-driving") vehicles and robots for path planning, navigation, and obstacle avoidance. By understanding the 3D structure of the environment, these systems can plan safe and efficient paths. In augmented reality (AR) applications, depth information may be used in accurately placing virtual objects in the real world, ensuring they interact realistically with the physical environment. In performing a virtual greenscreen (chroma key) effect, depth information may be used to separate the foreground from the greenscreen background to isolate subjects for cleaner extraction and parallax and perspective effects may rely on depth information to calculate accurately. Further, depth information can be used to aid in stabilization and achieving six degrees of freedom (6Dof) in video. Analyzing depth information can be used to more accurately estimate the 3D motion of the camera which can be used to compensate for camera shake and unwanted movements. Additionally, depth information can be used to aid in stabilization of video by helping distinguish between foreground and background elements. Different stabilization techniques may be applied to the background and foreground separately. This allows for more natural-looking stabilization while preserving the movements of the main subjects in the scene.

One way to obtain depth information is through the use of multiple cameras. Depth information from multiple cameras is obtained through a process called stereo vision. Stereo vision utilizes the disparity between corresponding points in two or more images captured by different cameras to calculate the depth or distance of objects in the scene. Two or more cameras are placed side by side, mimicking the human visual system where each eye perceives the scene from a slightly different viewpoint. The cameras capture the same scene simultaneously, producing two or more images of the same objects. The images are then processed to find corresponding points or features in both views. Once the corresponding points are identified, the disparity between them is computed. Disparity represents the horizontal shift or pixel difference between the corresponding points in the left and right images. Objects that are closer to the cameras will have a larger disparity, while distant objects will have a smaller disparity. Using the disparity information and the baseline (distance between cameras), the depth of each corresponding point can be calculated using triangulation. Triangulation is a geometric method that leverages the principles of similar triangles to determine the distance of an object from the cameras.

Obtaining depth information using a single camera source, called monocular vision, is more challenging. Existing techniques may be optimized for estimating depth in single images or have no knowledge of neighboring frames or motion which may lead to flickering when applied to video. Other techniques provide accurate depth data, but the data provided is sparse and struggles with moving subjects such as people, cars, and water in a video. While single-image depth estimation has made significant progress, it remains a challenging problem, and there is ongoing research to improve accuracy and robustness in various real-world scenarios.

DETAILED DESCRIPTION

Figure 1:
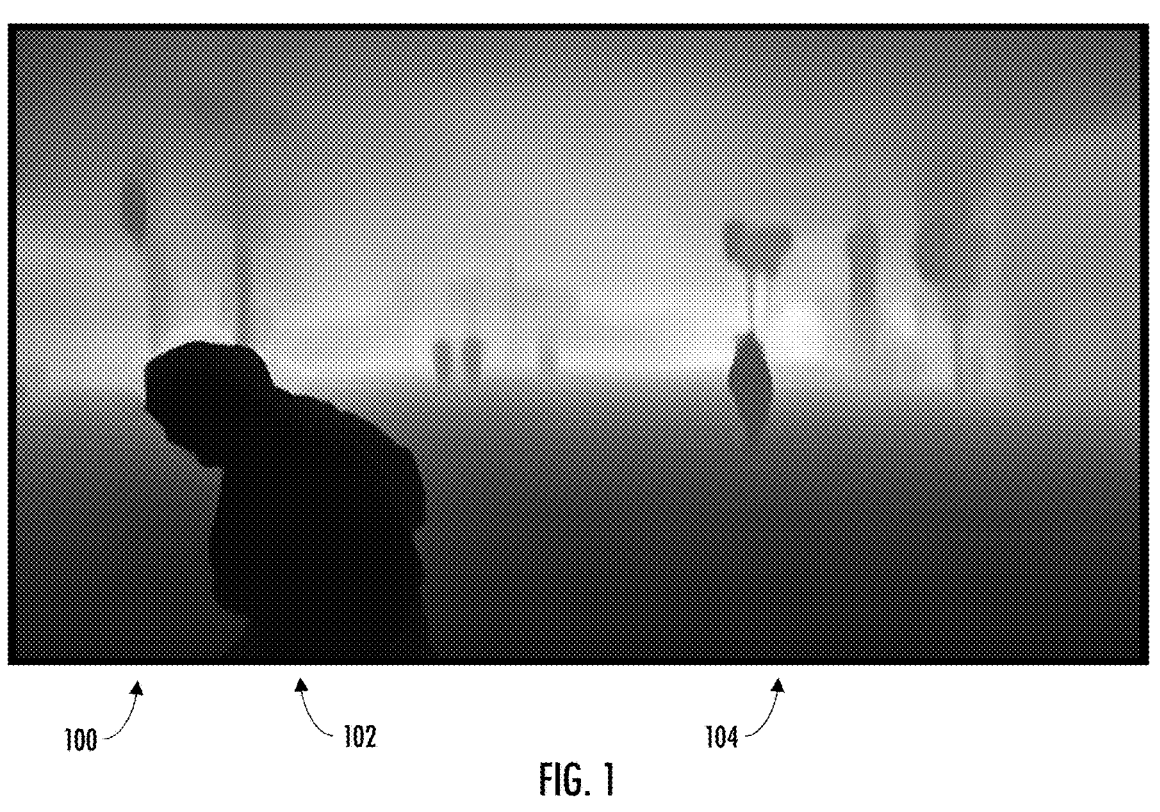
FIG. 1 illustrates a depth map using an exemplary depth estimation technique of a frame of a video.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Overview

Aspects of the present disclosure combine single-image depth estimation (SIDE) techniques with structure-from-motion techniques for improved depth accuracy. In some examples, a machine learning (ML) model is used to generate a dense depth map based on one or more frames/images of a video. Structure-from-motion (SFM) analysis is performed on the video to determine depth information from camera movement in the video. The structure-from-motion techniques may generate more accurate data than the ML model, however, the data from the ML model may be denser compared with the SFM depth data. The dense ML model depth map may be augmented by the SFM depth data. Augmentation may include fitting the relative depths determined by the ML model depth map to the absolute depth in the SFM data. The result is more accurate dense depth information.

As used herein, a "depth map" is an image or image channel that contains information relating to the distance of the surfaces of scene objects or pixels from a viewpoint. Most examples of depth maps used in the present disclosure shows luminance in proportion to the distance from a camera or other capture device where nearer surfaces are darker and further surfaces are lighter. Other examples of depth maps show luminance in relation to the distances from a nominal focal plane of the image/video, where surfaces closer to the focal plane are darker and surfaces further from the focal plane are lighter (both closer to and also further away from the viewpoint/camera) and may be used with equal success. Depth maps may be used or related to depth buffers/Z-buffers, where the "Z" refers to the central axis of view of a camera/capture device as opposed to the absolute Z axis of a scene.

As used herein, a "dense depth map" refers to a depth map that has a greater number of depth values compared to a "sparse depth map." Likewise, a "sparse depth map" refers to a depth map that has a fewer number of depth values compared to a "dense depth map." In some examples, a dense depth map is a depth map that has no null/empty/transparent values and a sparse depth map includes at least one null/empty/transparent value. As used herein, values in two depth maps may be "co-located" when they describe the depth of the same pixel (or set of pixels) in an image or frame of video. In many embodiments, operations (e.g., differences, blends) performed on co-located depth values in two depth maps may only involve non-null/empty/transparent values within the depth map.

Aspects of the present disclosure create a depth map using a combination of sparse and deep depth data with dense artificial intelligence/machine learning model data that performs monocular depth estimation (that only uses a single frame of data to estimate depth) also known as single-image depth estimation (SIDE). One problem with certain implementations of ML/AI model data is normalizing of the depth information which may create discontinuities between frames of video. Other problems include scaling inconsistencies when applied to scenes that differ from training data. Sparse but more accurate/deep data may be determined via a Structure-from-Motion (SfM) model and converted to points of pixel data representing known depths. Other methods of obtaining the deep data including via sensors (e.g., LiDAR), stereo-captured images/parallax data, or other image processing techniques (e.g., optical flow) may also be used. Aspects of the present disclosure curve fit (i.e., minimizes the difference between) the dense depth output of the AI model to the higher quality but sparser data of the SfM model.

The depth map may be further refined by performing local corrections to the AI depth map based on regions near the sparse/SfM pixel values. The frame may be broken up into regions based on the locations of SfM pixel values. Local difference minimization may be performed in each region independently. The local depth map modifies the coarse depth map by further minimizing the difference to the SfM pixel values.

Depth Map Generation Using Machine Learning Techniques

Single-image depth estimation (SIDE) is the process of inferring the depth or distance information of a scene from a single 2D image without using additional stereo images or depth sensors. It is a challenging problem in computer vision because the depth information is inherently missing in 2D images, and the problem is ill-posed as multiple 3D scenes can project to the same 2D image.

Several techniques have been developed to estimate depth from a single image. Certain traditional approaches use monocular depth cues, which are visual clues in the image that provide hints about the relative distances of objects in the scene. These depth cues may include: perspective, as the apparent size of objects changes with distance. Objects that appear smaller are generally farther away; texture gradient, density and sharpness of textures decrease with distance; occlusions, objects that obscure other objects are likely closer; and shadows/lighting variations that can reveal information about the 3D structure. Other techniques may leverage the out-of-focus blur present in images to estimate depth by analyzing the blur properties on objects within a scene.

More recently, ML models have been developed to estimate depth. Such techniques may use neural networks (including, e.g., Convolutional Neural Networks (CNNs)) to perform deep learning as part of the depth estimation process. These ML techniques are trained using large datasets of images with corresponding depth maps to learn the depth cues and relationships. These models take the input image and produce a corresponding depth map as the output. Some exemplary architectures of ML models include Encoder-Decoder Architectures including U-Net, FCN, and ResNet-based models. Some ML techniques use multi-task learning, where the model is trained to perform other related tasks simultaneously, such as semantic segmentation (classifying pixels into classes or objects) or surface normal estimation (predicting the surface orientation of the objects), to improve depth estimation accuracy.

For example, one such ML technique is ZoeDepth. This technique combines metric depth estimation (MDE) estimating the absolute distances in a scene and relative depth estimation (RDE) estimating relative distances between objects in a scene. In RDE, depth predictions per pixel are only consistent relative to each other. ZoeDepth is described in Bhat et al., ZoeDepth: Zero-shot Transfer by Combining Relative and Metric Depth, arXiv:2302.12288, Computer Vision and Pattern Recognition (cs.CV), submitted Feb. 23, 2023, incorporated by reference in its entirety.

Some SIDE techniques use relative distances to build a depth map. This may include SIDE techniques that use (or are trained on) absolute/MDE depth data. For example, each frame of the depth map might be normalized/standardized to have a particular average (or median) pixel brightness/depth value from which other depth values are scaled. This may offer advantages on a per-frame basis. For example, it may allow depth values to be more disbursed among the values allowed in the depth map or it allows the technique to consider information in a single frame. Such techniques, when applied to video can create discontinuities of depth information between frames of a video. One problem with certain SIDE techniques, including ML models, is the normalizing of the depth information. Visually this may be illustrated by having a preset average depth (brightness) value for the depth map. This may be likened to cameras using auto-exposure and attempt to normalize the brightness of an image to middle (18%) gray which is perceived as the halfway point between black and white (as human perception is not linear). This results in anomalies/flickering when the frames are played as a video as the model compensates for the overall tone as objects enter and leave or otherwise move in the frame. For example, a closer object (represented as darker/black) in the depth map may exit the frame. To compensate for the average depth in the frame changing, other areas of the frame may be (relatively) darkened to maintain the same average depth (or brightness) of the depth map. Other problems with ML models include depth inconsistencies between frames that differ from the training sets used (not based on normalizing the depth estimation).

Figure 2:
FIG. 2 illustrates a depth map using an exemplary depth estimation technique of a frame of a video.

FIG. 1 illustrates a first depth map 100 using an exemplary depth estimation technique of a first frame of a video and FIG. 2 illustrates a second depth map 200 using the exemplary depth estimation technique of a second frame of the video. In the video, a person 102 is moving across the frame and is shown in the first depth map 100 as being very close to the camera (represented by the black coloring) after which the person 102 exits the frame as shown in the second depth map 200. Between the capture of the first frame and the second frame of the video, the camera has not moved. The depth between the camera and static objects (e.g., the ground) have also not changed. However, after the person 102 exits the frame, the depth estimations from the first depth map 100 to the second depth map 200 change even for static objects. For example, the ground in the foreground area 104 of the first depth map 100 darkens considerably between the first depth map 100 to the second depth map 200. This falsely indicates the foreground area 104 moved closer to the camera between frames in the video. When replayed as a video, the changing depth maps generated by the exemplary depth estimation technique will flicker and flash as objects move in and out of the frame (even for static objects). When a post-processing device uses the depth maps to perform post-processing on the video (e.g., to add a blurring effect), the changing depth values for static components negatively impacts the overall look of the processed video.

Structure-from-Motion

Structure-from-Motion (SfM) is a computer vision technique used to reconstruct the 3D structure of a scene from a sequence of 2D images taken from different viewpoints. SfM enables the creation of 3D models from 2D image data, making it useful in various applications such as 3D mapping, augmented reality, and 3D modeling. According to aspects of the present disclosure, data from a generated SfM 3D model may be used to augment depth estimation techniques.

An exemplary SfM technique begins by performing feature extraction from a set of images/video data. Distinct features or keypoints may be extracted from each of the 2D images. These features may include corners, edges, or other salient points that are easily identifiable and repeatable across multiple images. Exemplary feature detection algorithms include Scale-Invariant Feature Transform (SIFT) and Oriented FAST and Rotated BRIEF (ORB) which may be used to extract keypoints and descriptors from the images.

The SfM technique may perform feature matching. Matching features may be determined between pairs of images. Feature descriptors from one image are compared with those in other images to find corresponding keypoints. Various matching techniques including brute-force matching or approximate-nearest-neighbor methods may be used to find matching features. The SfM technique may establish correspondences between three or more images. These correspondences may be used to form tracks or sequences of 2D keypoints that represent the same 3D point in the scene. The correspondences may be validated and refined to remove outliers or incorrect matches.

The SfM technique may reconstruct camera poses (position and orientation for each image relative to a common coordinate system. The camera poses may be determined by solving for the transformation matrices that align the 3D points (world coordinates) with their corresponding 2D projections (image coordinates) in each image. Bundle adjustment may be performed to optimize and refine the reconstructed camera poses and 3D points jointly, minimizing the reprojection error. Camera parameters and 3D points may be adjusted iteratively to reduce the discrepancies between the observed 2D keypoints and their projected 3D positions.

The SfM technique may generate a 3D point cloud. The point cloud may be a sparse 3D point cloud and represent the 3D structure of the scene. Each 3D point corresponds to a feature observed in multiple images. The point cloud consists of the 3D coordinates of these points in the common coordinate system. The technique may create a mesh from the point cloud and may include camera poses for each scene.

Figure 3:
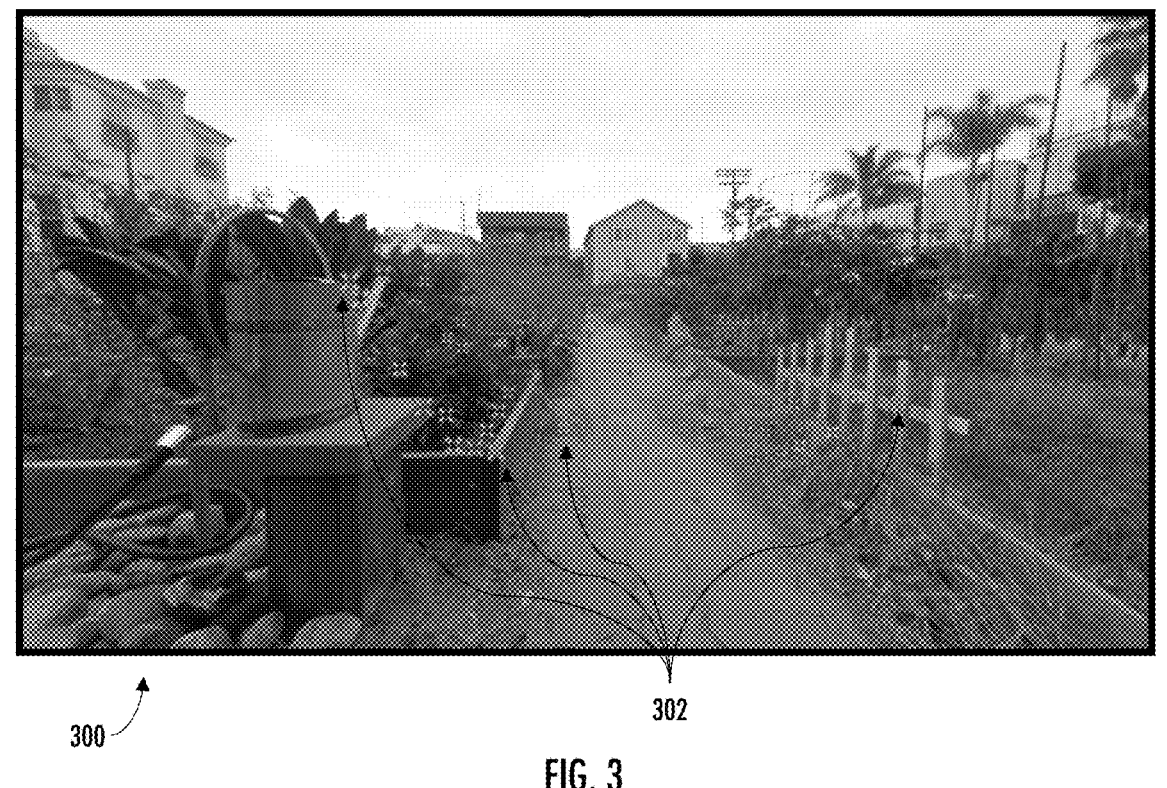
FIG. 3 illustrates an exemplary frame of a video augmented with depth information determined using a structure-from-motion technique according to aspects of the present disclosure.
Figure 4:
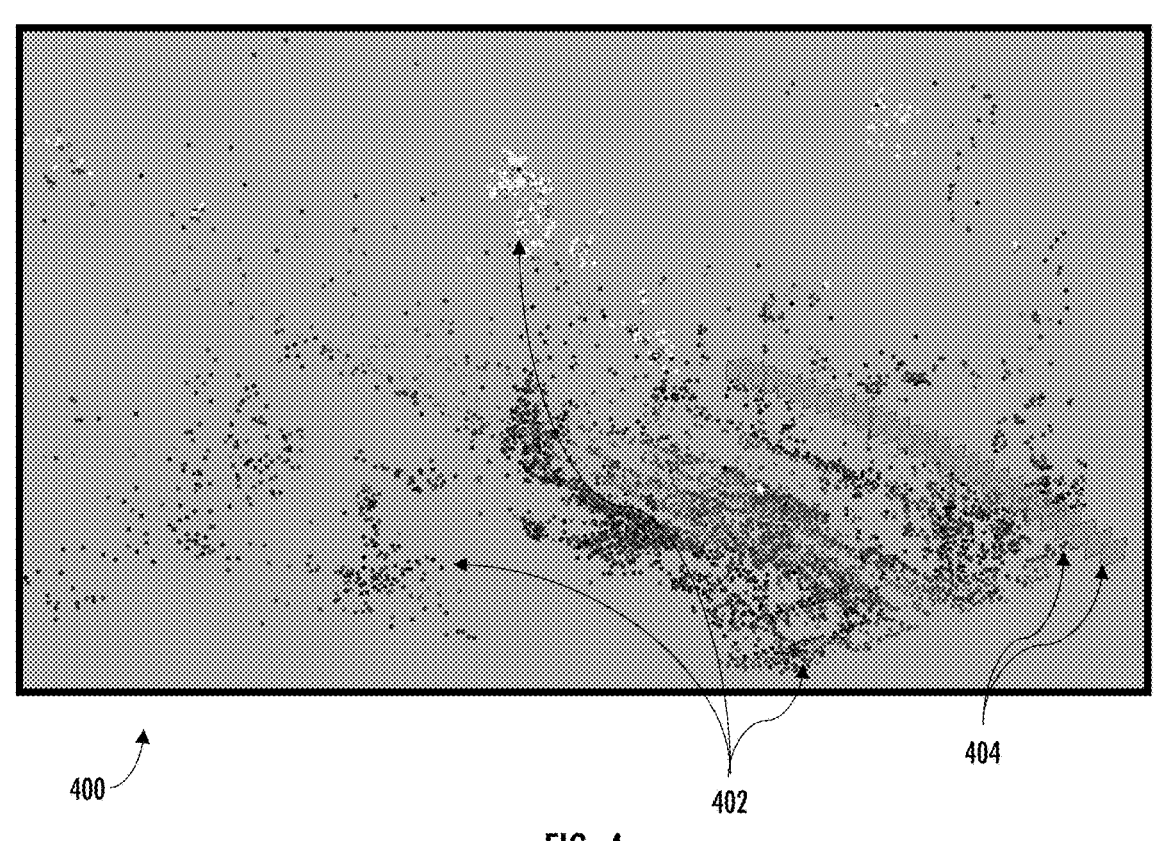
FIG. 4 illustrates an exemplary view of a three-dimensional point cloud generated using the structure-from-motion technique according to aspects of the present disclosure.

FIG. 3 illustrates an exemplary frame 300 of a video augmented with depth information determined using a structure-from-motion technique. Points 302 in the frame 300 illustrate areas of the sparse depth information determined using the SfM technique. FIG. 4 illustrates an exemplary view 400 of a three-dimensional point cloud generated using the structure-from-motion technique on the video of FIG. 3. Points 402 in the view 400 illustrate areas of sparse depth information determined using the SfM technique. In the view, lighter colored points are further away from the camera and darker colored points are closer to the camera. Also in the view 400 of the 3D point cloud is the pose (e.g., location and orientation) of the capture device when capturing frames 404 at different times during capture of the video. The movement of the capture device (as captured through the captured frames) may be used by the device to determine the depth of objects in the captured frames and build the point cloud.

Unfortunately, the point cloud as shown in view 400, is not dense enough to use the information to accurately perform many depth-dependent tasks like six-degrees-of-freedom stabilization or translational motion of the camera effects.

Example Operation

Figure 5:
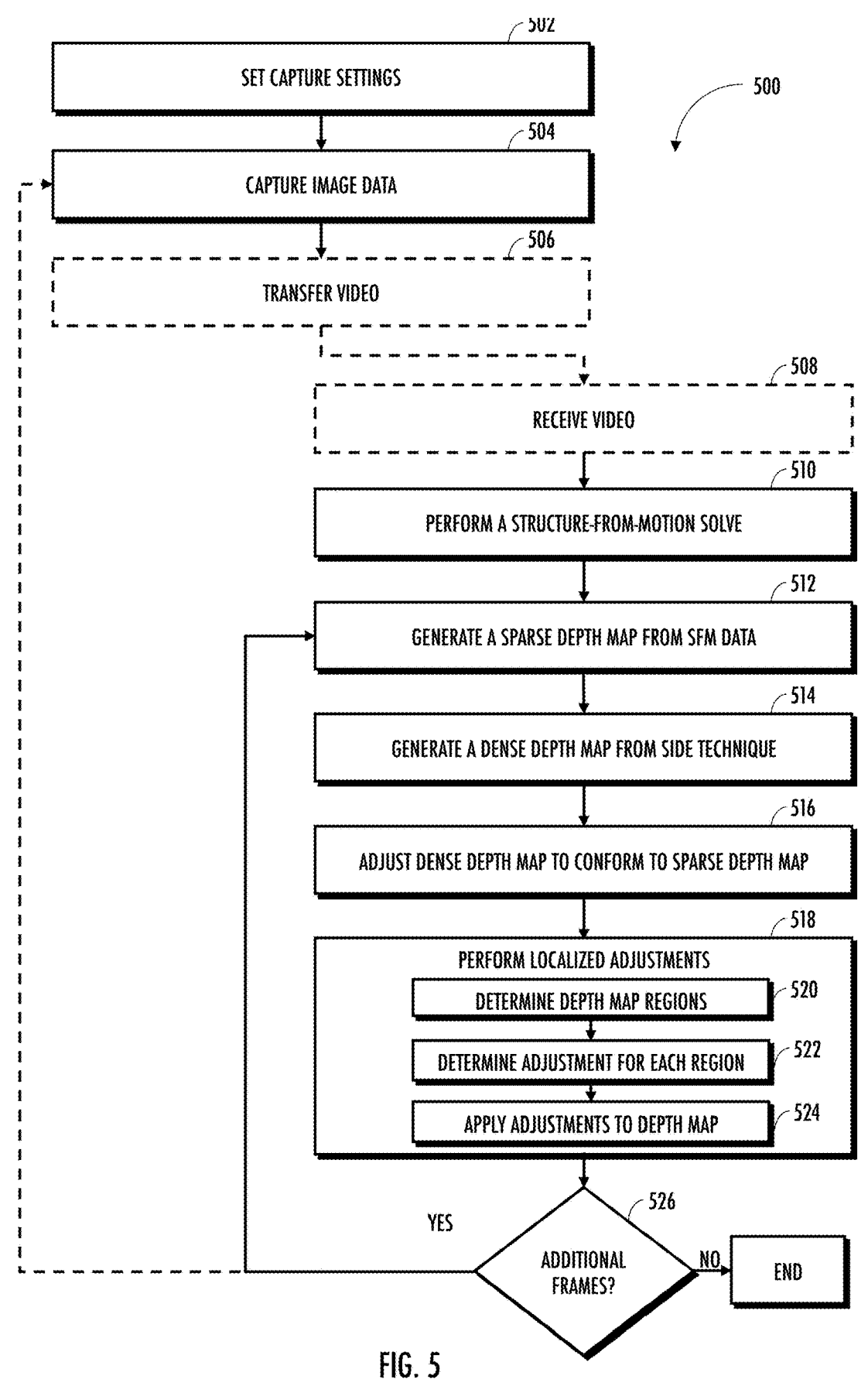
FIG. 5 illustrates an exemplary logical flow diagram of a combined single-image depth estimation and structure-from-motion technique for generating more accurate dense depth maps according to aspects of the present disclosure.

Various embodiments of the present disclosure describe using a combination of single-image depth estimation with structure-from-motion to determine more accurate dense depth data. In one exemplary embodiment, both an ML technique and an SfM technique may be used on frames of video data. As the SfM data is more accurate than the ML derived data, the SfM data may be used as a "ground truth," and dense depth data from the ML technique may be fit to sparse depth information determined using the SfM solve. FIG. 5 illustrates an exemplary logical flow diagram of a combined SIDE and SfM technique for generating more accurate dense depth maps according to aspects of the present disclosure. Certain steps (e.g., steps 502-506) of method 500 may be performed by a camera device. Other steps (e.g., steps 508-524) may be performed by processing systems on in the camera or by a separate post-processing device.

In one exemplary embodiment, the camera may be set to capture frames of video data (step 502 of the method 500). In some examples, capture settings of the frames/video may be different than the intended playback settings to allow certain effects to be added in post-processing. For example, additional frames (at, e.g., a higher frame rate) may be captured as additional data for SfM or video with a wide depth of field may be captured for ease of object detection and depth estimation with blur/bokeh effects to be added in post-processing.

At step 504, a scene may be captured using the physical capture settings. The captured image data is then processed by a processing pipeline of the camera (e.g., the image signal processor (ISP), the processing system, and the codec) before being stored as video on removable storage media. In some embodiments, the camera may perform "in-camera" processing. Typical examples of in-camera processing may include e.g., stabilization, rate adjustment (e.g., slow motion), color correction, tone mapping, and/or augmented dynamic range (HDR, etc.). Furthermore, some motion information may be determined in-camera (e.g., as part of video encoding) and saved for reuse during post-processing (either in the encoded video or as separate metadata). In some cases, in-camera motion information may be stored for later use during post-processing in place of, or in addition to, optical flow and motion vector generation. In other embodiments, raw sensor data from the camera sensor may be directly saved to the removable storage media. Sensor data (e.g., of the camera location/orientation) may be used (using, e.g., a SfM technique) during post-professing to determine depth information of the scene.

In some cases, the captured video from the camera may be transferred to a post-processing device to determine depth information in the video (step 506 and step 508). For example, a user may capture footage via their action camera, and then immediately transfer to their smart phone to perform fast, low-quality edits "in-the-field"; in other situations, the user may transfer footage to their laptop or workstation to perform more compute-intensive high-quality edits. In some cases, a hybrid approach may be used, e.g., smart phone edits may be further improved by the laptop, etc. Typically, video may be transferred via a removable storage media such as a memory card or a data/network interface (wired or wireless).

At step 510, the post-processing device performs a SfM technique on the video. The SfM technique may generate a 3D point cloud of depth information of a scene of the video. In some examples, LIDAR/RADAR/stereo image data may be obtained and a point cloud/depth map may be generated based on the LIDAR/RADAR/stereo image data or the SfM point cloud may be adjusted or augmented with the LIDAR/RADAR/stereo image data.

In some examples, the SfM data may be cleaned. For example, certain objects (e.g., moving objects) or noise may be masked/removed from the data set or adjusted to conform with local data. In some examples, semantic segmentation can be used to mask points. Semantic segmentation categorizes each pixel in an image into a class or object and may be performed by an ML model.

At step 512, the post-processing device performs generates a sparse depth map based on the 3D point cloud. A different depth map may be generated for each frame of the video data. The sparse depth map may include empty, null, or transparent values indicating a lack of depth data corresponding to a particular pixel of the frame of the video data. The post-processing device may project the 3D points onto a 2D plane (e.g., the image plane based on the capture pose of the capture device) to determine their distances.

In some examples, the projection can be performed using the pinhole camera model, where the 3D point (X, Y, Z) is projected to the 2D image plane of the frame as (u, v), where u and v are the pixel coordinates in the frame. Some further examples consider lens distortion of the capture device when performing the projection. After projecting the 3D points onto the 2D frame, the post-processing device may calculate the depth for each point in the 3D point cloud (or each non-occluded point in the 3D point cloud). The depth value may be derived from the Z-coordinate of the 3D point after the projection. Depth (d) may be calculated as $d = \sqrt{X^2 + Y^2 + Z^2}$. The post-processing device may generate the sparse depth map by assigning the computed depth values to their corresponding pixel locations in the frame. Each pixel in the sparse depth map will represent the distance of the corresponding 3D point from the capture device of the frame.

Figure 6:
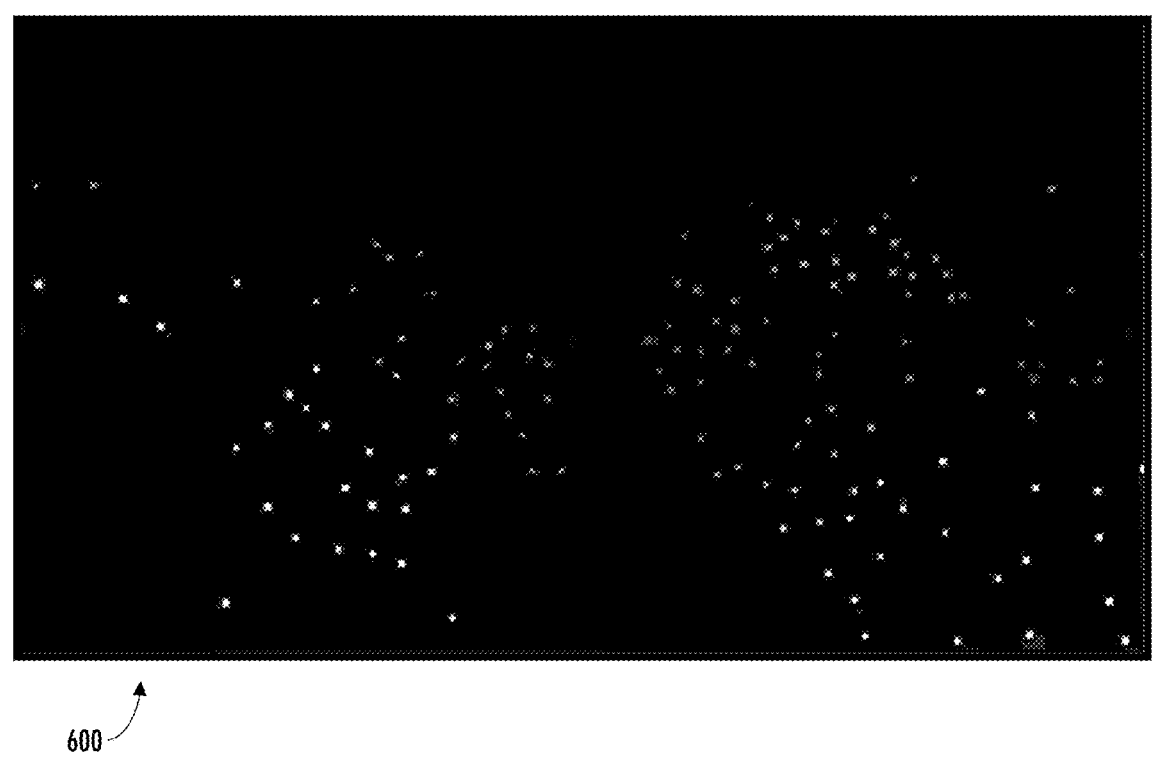
FIG. 6 is a graphical representation of an exemplary sparse depth map according to aspects of the present disclosure.

FIG. 6 is a graphical representation of an exemplary sparse depth map 600. Points in the sparse depth map 600 that are darker (closer to black) are farther away and points that are lighter (closer to white) are closer. Empty/null depth values in the sparse depth map 600 are shown in black for ease of illustration (and to show contrast with other depth values in the sparse depth map 600).

Figure 7:
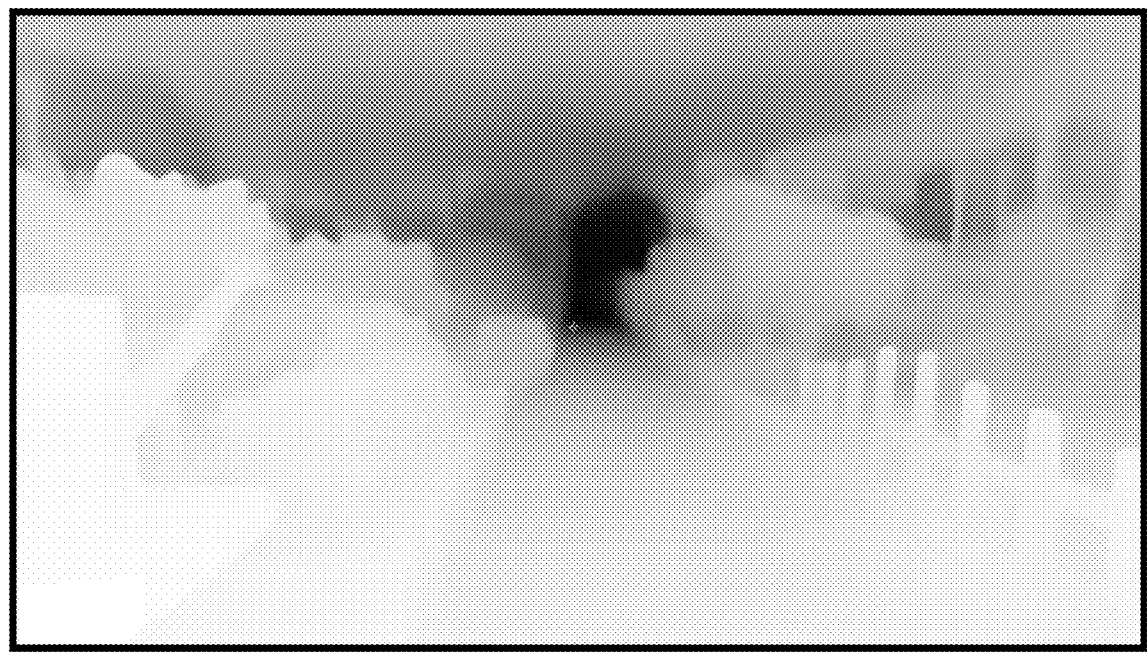
FIG. 7 is a graphical representation of dense depth map generated using a single-image depth estimation technique according to aspects of the present disclosure.

At step 514, the post-processing device performs a SIDE technique on the video data generating a dense depth map. In some examples, the SIDE technique may include a ML based technique to generate depth maps from single images. FIG. 7 is a graphical representation of dense depth map 700 generated using a SIDE technique. Darker pixels in the dense depth map 700 (closer to black) are farther away and pixels that are lighter (closer to white) are closer.

At step 516, the post-processing device adjusts the dense depth map to conform to the values of the sparse depth map. This may fix any normalization performed in the SIDE technique/depth map and therefore any flickering when viewing the depth maps of consecutive pixels as a video.

In some examples, the differences between the values of equivalent (e.g., co-located) pixels/locations should be minimized. In some examples, these adjustments may shift values in the dense depth map but may not alter the relative depths in the depth map (e.g., making a depth value greater or lower than another depth value within the depth map). Stated another way, depth values in the sparse depth map are used to re-map depth values in the dense depth map by matching (or substantially matching) the values of co-located pixels in the depth map and shifting other pixels in the dense depth map in line with the adjustment made to the co-located pixel. Shifts may be linear (i.e., greater and lesser depth values are shifted to an equivalent relative degree based on the matching, by a scale value) or non-linear (i.e., greater and lesser depth values are shifted unevenly relative to each other) based on the matching). Shifts may impact the background (with larger depth values) to a greater or lesser degree than to the foreground (with smaller depth values) or middle ground (middle depth values). In other examples, shifts may impact the foreground or middle ground more than the other depth values.

Difference data (sparse/SfM pixels values minus AI pixel values or AI pixel values minus sparse/SfM pixel values) may be determined by stacking the two depth maps. In some examples, the differences at each co-located pixel are summed across the entire depth map to determine a total difference value which may be minimized by comparing with other fit attempts.

In one exemplary embodiment, image manipulation techniques are used to fit the dense data to the sparse data. For example, the "curves" or histogram of the dense/ML depth map may be manipulated to minimize the difference between the "known" pixel values of the SfM generated sparse depth map and the ML generated dense depth map. Visually, this curve fitting may be performed by stacking the known pixels on the AI depth map and applying a difference blending mode (which visualizes the absolute difference between the color/brightness values of the pixels in each corresponding position with smaller pixel differences as black/dark and larger differences as white/light) and then manipulating the histogram or brightness curves to achieve the smallest (visually darkest) overall result. The difference blending mode (and, in some examples, the SfM depth data) may then be removed resulting in a dense depth map that fits the sparse depths observed in the SfM model.

Since some areas of a frame may be of greater importance (e.g., the center of the frame or an area with a subject of interest) the difference data may be scaled/weighted to ensure certain portions have a comparably better fit. In other embodiments, this curve fitting may be done via geometric or spatial manipulations which are then translated to a depth map.

Due to the nature of using only a single-image and the ML model, depth estimations may not perfectly mirror the relative depth calculations determined in the SfM model (which uses multiple frames). In fact, some objects or areas of the image may be estimated by the ML model to be at a very different relative depth than the SfM model. For example, the SfM model may predict an object to be in the foreground whereas the ML model predicts the object to be in the background. In such cases, local correction may provide an even more accurate fit. At step 518, the post-processing device may further refine the depth map by performing local/fine corrections to the adjusted dense depth map. Local adjustments may modify/re-map the adjusted dense depth map to better conform to the values of the sparse depth map.

Figure 8:
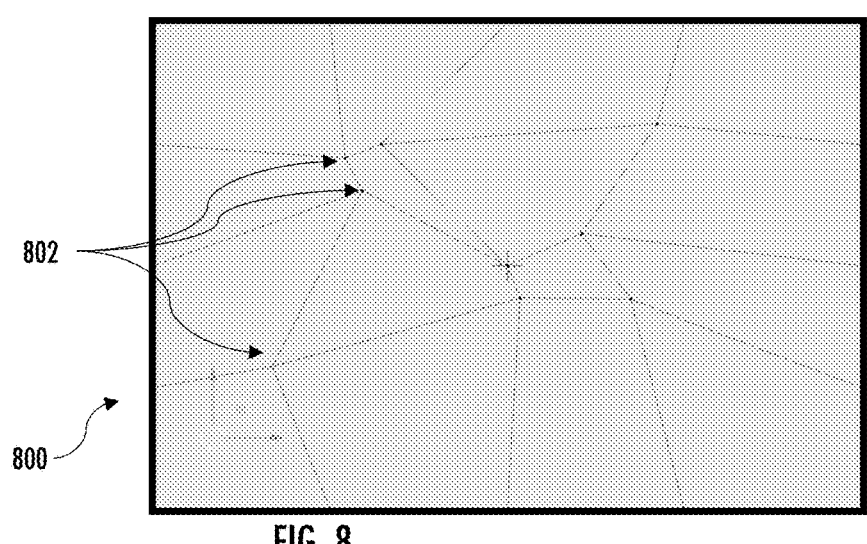
FIG. 8 is an exemplary graphical representation of region map according to aspects of the present disclosure.

At step 520, the post-processing device may perform local corrections by splitting the adjusted depth map into regions surrounding the sparse (SfM derived) pixel values. In one example, the frame is broken up into regions based on the locations of the SfM pixel values (in the sparse depth map). FIG. 8 is an exemplary graphical representation of region map 800. Sparse points 802 from the sparse depth map are shown in the region map 800 as forming the center of the regions. Polygonal edges between various sparse points 802 are included to visualize the sizes/shapes of regions.

In other examples, regions may be determined based on distances between the SfM pixel values. In further examples, a region may be formed by groups of SfM pixel values with the same/similar depths/brightness. In some examples, regions may be determined to be regular shapes (e.g., rectangles, squares, triangles, circles, other polygons, etc.) fit between the SfM pixel values. In further examples, shapes of the regions may be an irregular or organic shape with edges/polygonal edges midway between SfM pixel values. In other examples, regions may be determined based on feature, object, or edge detection. For example, an object in a scene may be determined to be a building, the building (or a face of the building) may be a region. The number of regions may be determined by the number of SfM pixel values, how densely packed the SfM pixels are, the dimensions/resolution of the ML depth map, system resource usage, and/or user input.

Local difference minimization may be performed in each region independently. Some regions may not differ or not differ significantly from the coarse (global) difference minimization (of steps 510-516). For example, the difference value(s) between the dense depth and sparse depth values in a particular region may be small after the coarse difference minimization is performed. In such examples, local minimization may not be performed or may not modify the coarse curve fitting. In other regions, where the differences are more pronounced (e.g., difference pixel values are relatively bright compared to other regions), fine/local difference minimization may be performed to alter the brightness curves to minimize the pixel difference in that region.

At step 522, the post-processing device may determine a local adjustment for each region. The adjustment may be based on the difference values between pixels in the region from the sparse depth map of SfM data and the adjusted dense depth map (of step 516). Where a region includes multiple points of the sparse depth map (and difference values) the difference values may be averaged (or a center weighted average taken) to determine adjustment values for the region.

A falloff amount or blend may be determined at the edges of the regions. In some examples, to not create distinct edges between regions, curve modifications from the coarse difference minimization may be blended or may fade between regions/SfM pixels to interpolate these curve differences between regions. The falloff may be based on a transition or gradient between a difference at a point/region and a difference at neighboring points/regions. In other examples, for example where the regions are based on object detection, the falloff may be sharp/distinctive at the edges of the object. Falloff may be linear. In other examples, fall is not linear. For example, the post-processing device may use a falloff curve to determine how the influence of a particular local adjustment diminishes as you move away from the point/center of the region. The fall off curve from multiple points/regions may interact and influence the falloff in a non-linear manner.

A depth map modification layer may be created based on the local curves alterations and determined falloff/blend. The depth map modification layer may be blended into or scales values in the coarse depth map creating a local depth map. The local depth map modifies the coarse depth map by further minimizing the difference to the SfM pixel values.

Figure 9:
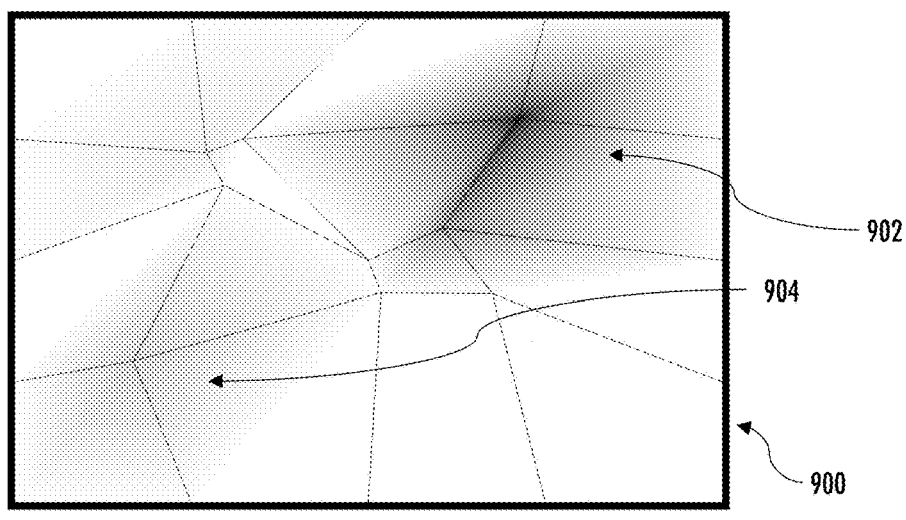
FIG. 9 is an exemplary graphical representation of region map according to aspects of the present disclosure.
Figure 10:
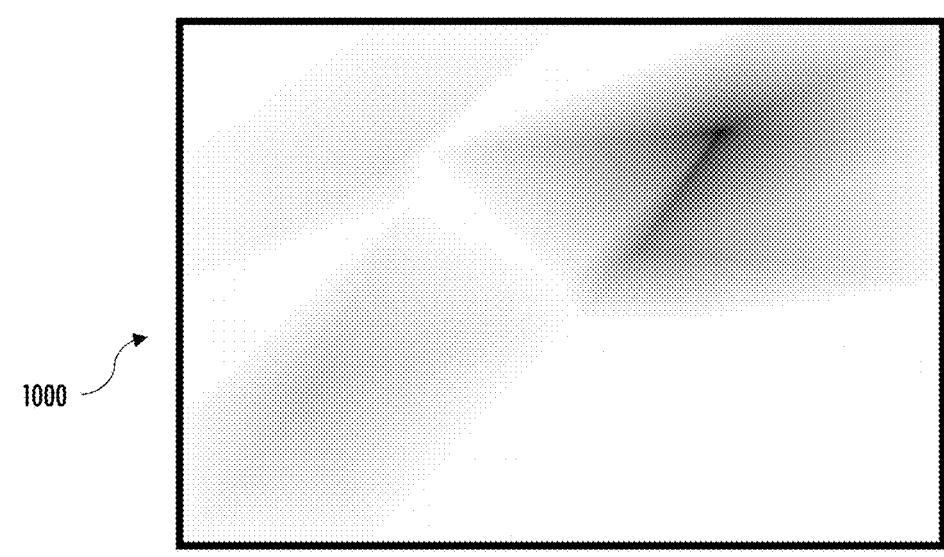
FIG. 10 is an exemplary depth map modification layer according to aspects of the present disclosure.

FIG. 9 is an exemplary graphical representation of region map 900. Region map 900 includes regions 902 and 904. Regions 902 and 904 have different local curves adjustments and falloffs. As shown the region 902 has a greater adjustment and falloff than the region 904 as indicated by the darker colors of the region. Region map 900 shows the polygonal edges between points of the sparse depth map (as also shown in FIG. 8). FIG. 10 is an exemplary depth map modification layer 1000. As shown, the depth map modification layer 1000 is the adjustments and falloff shown in region map 900 of FIG. 9 without the points and polygonal edges.

At step 524, the post-processing device may apply the determined adjustments (with the determined falloff) to the dense depth map. The application may apply the local adjustments to the coarse depth map to generate a local depth map. In some examples, a depth map modification layer is applied to the dense depth map. The value of each pixel/depth value of the dense depth map may be multiplied by the corresponding values in the depth map modification layer with the resulting values scaled (e.g., divided by the maximum depth value, e.g., 255). Visually, the dense depth map may be stacked on the depth map modification layer and a multiply blend applied.

Figure 11:
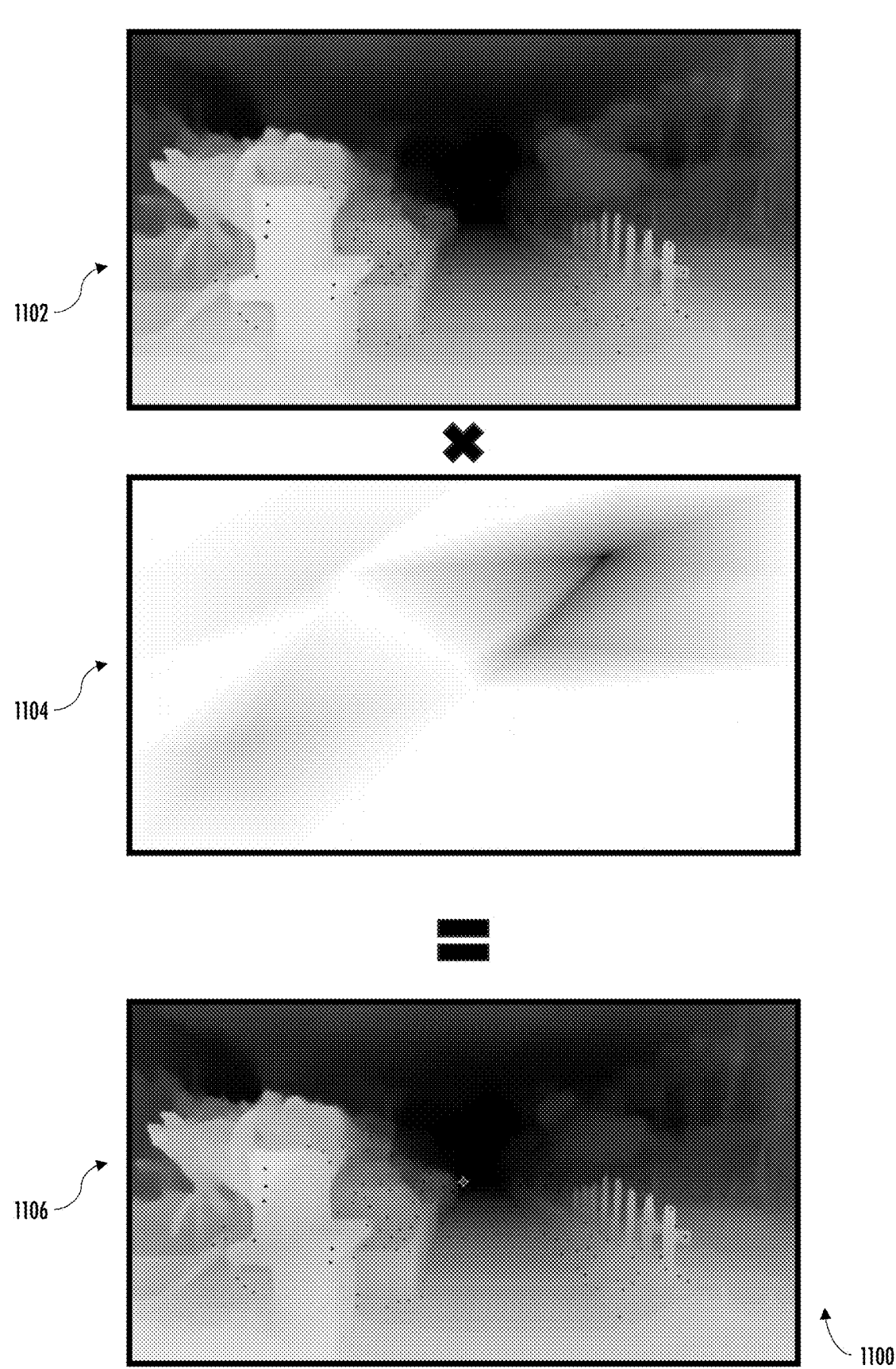
FIG. 11 is a graphical representation of applying a depth map modification layer to a dense depth map according to aspects of the present disclosure.

FIG. 11 is a graphical representation 1100 of applying a depth map modification layer to a dense depth map. Dense depth map 1102 is an exemplary adjusted depth map and depth map modification layer 1104 may include local adjustments to apply to the dense depth map 1102 based on differences between the dense depth map 1102 and a sparse depth map. The local depth map 1106 is generated when the dense depth map 1102 is adjusted (using a multiply blend) with the depth map modification layer 1104.

The post-processing device may repeat the process for the next frames (step 526, yes branch), or end when there are no further frames to process (step 526, no branch). The SfM solve (step 510) may be reused on subsequent frames and a sparse depth map may be generated based on the camera view/pose of the next frame (at step 512). For implementations that generate a depth map (alone or as one step of a different post-processing task) during an on-going capture (e.g., in-camera processing), the flow returns to step 504 and capture the next frame. In such examples, the SfM solve may be re-performed or augmented with the data of the new frame (at step 510). The post-processing device may then perform additional post-processing of the video including using techniques that use the generated depth map(s).

Technological Improvements and Other Considerations

The above-described system and method solves a technological problem in industry practice related to video post-processing. Conventional post-processing techniques relied on single-image depth estimation techniques that produce disparate depth values between frames and multi-image techniques that do not provide dense depth data useful for higher-quality post-processing. In other words, the various solutions directly address problems that are introduced by conventional depth determination techniques used in isolation. Specifically, aspects of the disclosed techniques augment dense depth information obtained using SIDE techniques with more accurate sparse depth data improving the quality of further post-processing (with dense data) and reduces depth anomalies between frames of a video.

Moreover, the exemplary combination does not merely combine two well-known techniques in any arbitrary order. Conventional wisdom would not combine SIDE and SfM techniques as described throughout as the different techniques would be used in different applications based on whether sparse/more accurate or dense/less accurate data was needed/preferable. A simple combination of the techniques (e.g., combining depth maps) would ostensibly introduce depth anomalies in a combined depth map. However, the foregoing techniques use an "ordered combination" to scale the less accurate dense depth estimate with the more accurate sparse depth estimate. In other words, the ordered combination is both an unconventional and specific technical solution.

Exemplary Architecture

System Architecture

Figure 12:
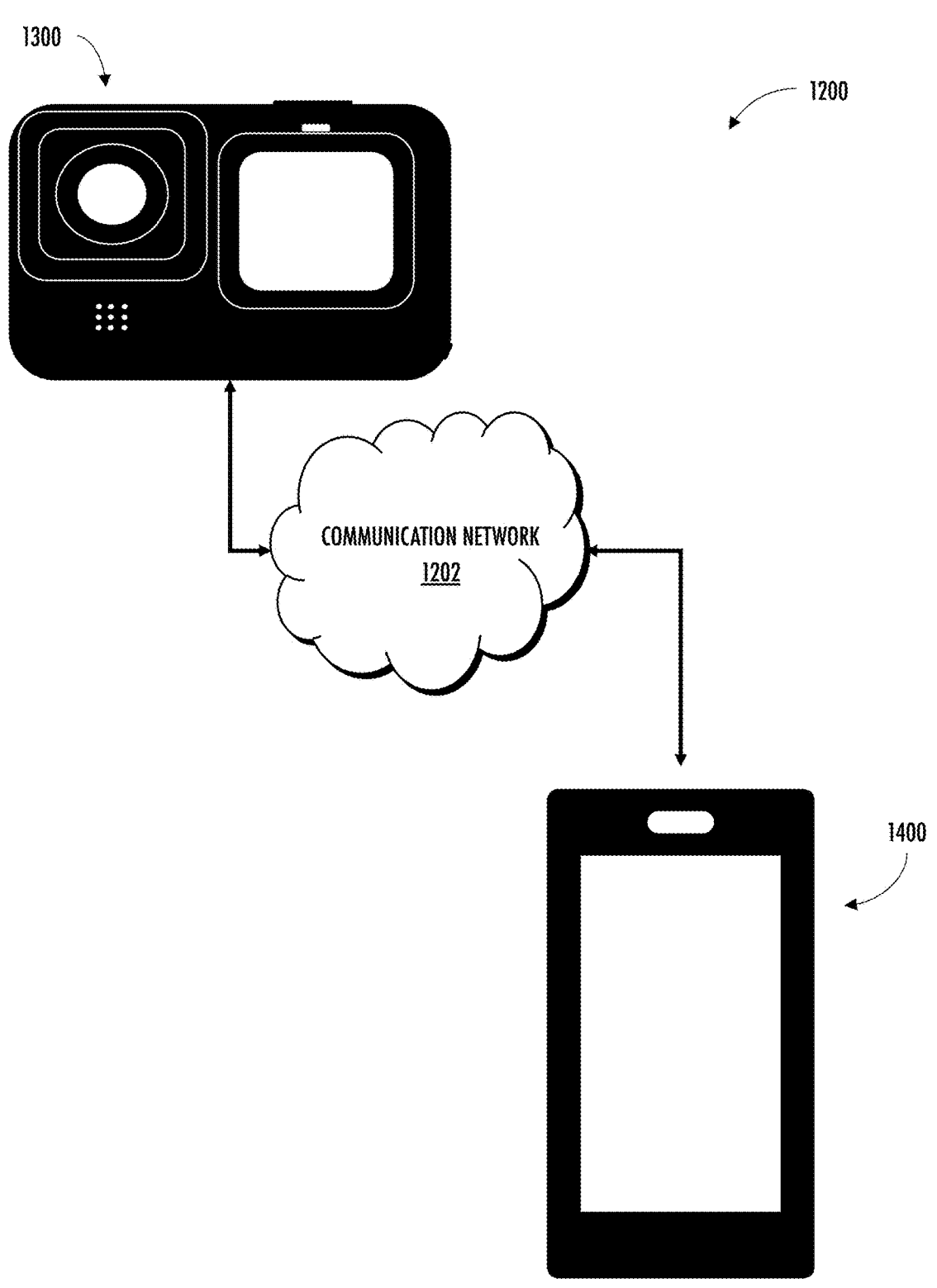
FIG. 12 is a logical block diagram of the exemplary system architecture, in accordance with various aspects of the present disclosure.

FIG. 12 is a logical block diagram of the exemplary system 1200 that includes: a capture device 1300, a post-processing device 1400, and a communication network 1202. The capture device 1300 may capture one or more videos or frames of videos and transfer the videos to the post-processing device 1400 directly or via communication network 1202 for post-processing to, e.g., generate a depth map and perform post-processing to captured video. The post-processed video may be shared with additional devices via communication network 1202.

The following discussion provides functional descriptions for each of the logical entities of the exemplary system 1200. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 1200 is separately provided below.

Functional Overview of the Capture Device

Functionally, a capture device 1300 captures and processes video. The captured video may include wide depth-of-field capture for better application of depth estimation and the later addition of post processing effects such as image stabilization (with e.g., six-degrees of freedom), chroma key, and (post-capture) bokeh effects. In certain implementations, the capture device captures and processes the video to generate a depth map to apply further processing techniques. In other implementations, the capture device 1300 captures video that is transferred to a post-processing device for further processing, including adding post-processing motion blur to the video.

The techniques described throughout may be broadly applicable to capture devices such as cameras including action cameras, digital cameras, digital video cameras; cellular phones; laptops; smart watches; and/or IoT devices. For example, a smart phone or laptop may be able to capture and process video. Various other applications may be substitute with equal success by artisans of ordinary skill, given the contents of the present disclosure.

Figure 13:
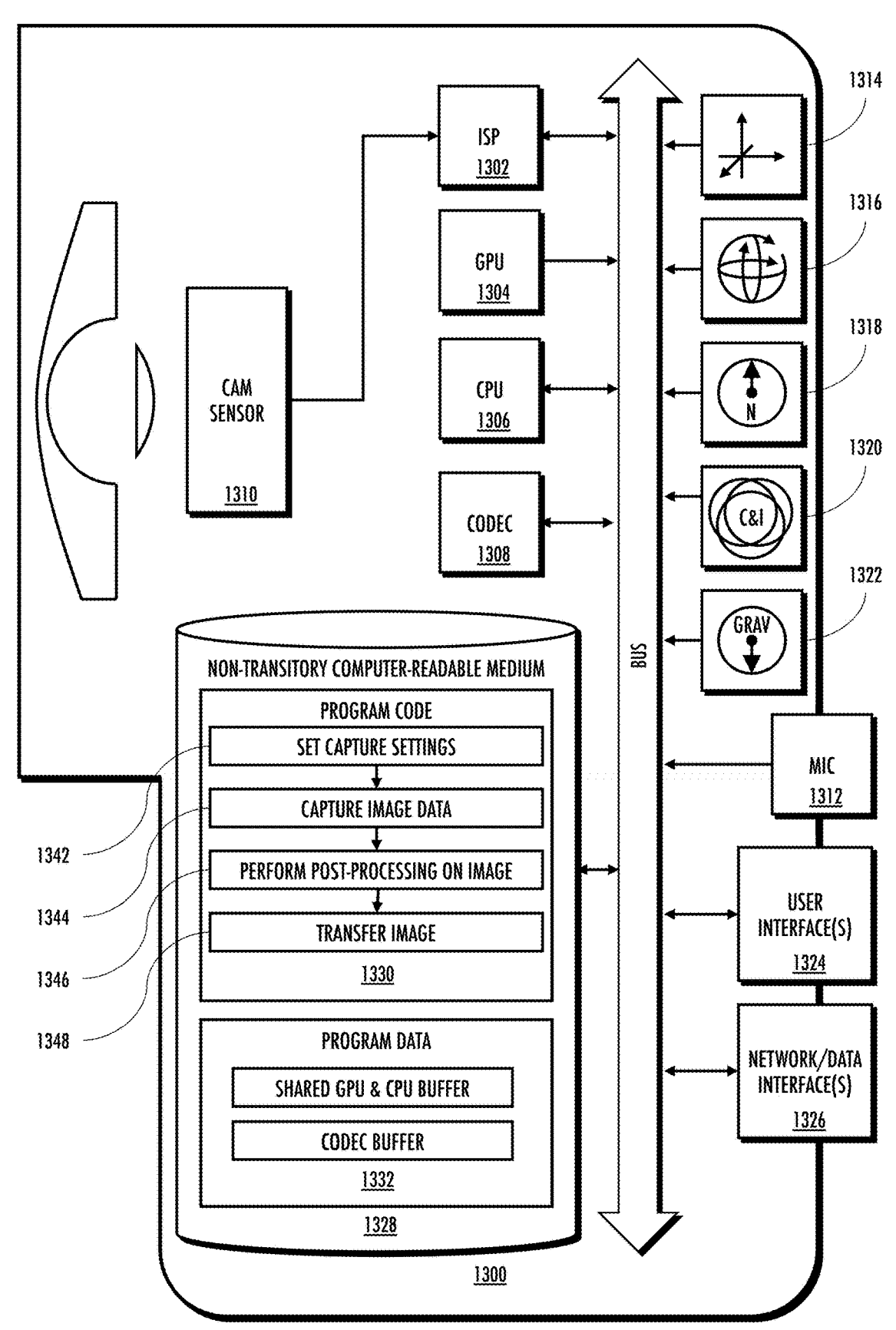
FIG. 13 is a logical block diagram of an exemplary capture device, in accordance with various aspects of the present disclosure.

FIG. 13 is a logical block diagram of an exemplary capture device 1300. The capture device 1300 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary capture device 1300.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 1310, a microphone 1312, an accelerometer (ACCL 1314), a gyroscope (GYRO 1316), and a magnetometer (MAGN 1318). These sensors may capture the pose of the exemplary capture device 1300. Additional sensors may RADAR/LIDAR sensors to determine depth information in a captured scene.

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the capture device 1300. In other embodiments, the sensor subsystem may be augmented by external devices and/or removably attached components (e.g., hot-shoe/cold-shoe attachments, etc.) The following sections provide detailed descriptions of the individual components of the sensor subsystem.

Camera Implementations and Design Considerations

In one exemplary embodiment, a camera lens bends (distorts) light to focus on the camera sensor 1310. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 1310 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for $\frac{1}{24}^{th}$ of a second. Similarly, 120 FPS using a 360° shutter angle exposes the photosensitive sensor $\frac{1}{120}$th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $\frac{1}{48}^{th}$ of a second at 24 FPS. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108M Pixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

Microphone Implementations and Design Considerations

In one specific implementation, the microphone 1312 senses acoustic vibrations and converts the vibrations to an electrical signal (via a transducer, condenser, etc.) The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

Inertial Measurement Unit (IMU) Implementations and Design Considerations

The inertial measurement unit (IMU) includes one or more accelerometers, gyroscopes, and/or magnetometers. In one specific implementation, the accelerometer (ACCL 1314) measures acceleration and gyroscope (GYRO 1316) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 1320). In one specific implementation, the magnetometer (MAGN 1318) may provide a magnetic north vector (which may be used to "north lock" video and/or augment location services such as GPS), similarly the accelerometer (ACCL 1314) may also be used to calculate a gravity vector (GRAV 1322).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Functional Overview of the User Interface Subsystem

Functionally, the user interface subsystem 1324 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1324 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 1324 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 1324 is an integral part of the capture device 1300. In other embodiments, the user interface subsystem may be augmented by external devices (such as the post-processing device 1400, discussed below) and/or removably attached components (e.g., hot-shoe/cold-shoe attachments, etc.) The following sections provide detailed descriptions of the individual components of the sensor subsystem.

Touchscreen and Buttons Implementation and Design Considerations

In some embodiments, the user interface subsystem 1324 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 1324 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many BLE applications may be triggered by a physical button press to further reduce GUI power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beam-forming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 1326 may include network interfaces including, but not limited to: Wi-Fi, Bluetooth, Global Positioning System (GPS), USB, and/or Ethernet network interfaces. Additionally, the network/data interface 1326 may include data interfaces such as: SD cards (and their derivatives) and/or any other optical/electrical/magnetic media (e.g., MMC cards, CDs, DVDs, tape, etc.).

Network Interface Implementation and Design Considerations

The communication subsystem including the network/data interface 1326 of the capture device 1300 may include one or more radios and/or modems. As used herein, the term "modem" refers to a modulator-demodulator for converting computer data (digital) into a waveform (baseband analog). The term "radio" refers to the front-end portion of the modem that upconverts and/or down-converts the baseband analog waveform to/from the RF carrier frequency.

As previously noted, communication subsystem with network/data interface 1326 may include wireless subsystems (e.g., 5th/6th Generation (5G/6G) cellular networks, Wi-Fi, Bluetooth (including, Bluetooth Low Energy (BLE) communication networks), etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the capture device 1300 may include one or more data interfaces for removeable media. In one exemplary embodiment, the capture device 1300 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.). Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 13, the control and data subsystem may include one or more of: a central processing unit (CPU 1306), an image signal processor (ISP 1302), a graphics processing unit (GPU 1304), a codec 1308, and a non-transitory computer-readable medium 1328 that stores program instructions and/or data.

Processor-Memory Implementations and Design Considerations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 13) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further sub-divide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the capture device 1300. In one exemplary embodiment, data may be stored as non-transitory symbols (e.g., bits read from non-transitory computer-readable mediums.) In one specific implementation, the memory subsystem including non-transitory computer-readable medium 1328 is physically realized as one or more physical memory chips (e.g., NAND/NOR flash) that are logically separated into memory data structures. The memory subsystem may be bifurcated into program code 1330 and/or program data 1332. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the capture device 1300 as firmware. In other embodiments, the program code may be dynamically stored (and changeable) via software updates. In some such variants, software may be subsequently updated by external parties and/or the user, based on various access permissions and procedures.

Generalized Operation of the Capture Device

In one embodiment, the non-transitory computer-readable medium includes a routine that enables the capture of video for adding motion blur in post-processing. In some examples, the capture device may perform parts or all of the post-processing on the device. In other examples, the capture device may transfer the video to another device for additional processing. When executed by the control and data subsystem, the routine causes the capture device to: set capture settings, capture image data, perform post-processing on the image data, and transfer the image data to a post-processing device. These steps are discussed in greater detail below.

At step 1342, the capture device may set capture settings. Capture settings may be retrieved via user input at the user interface subsystem 1324. Settings may also be determined via sensor data using the sensor subsystem to determine exposure settings, a camera mode may alter or constrain capture settings (e.g., an automatic mode, priority modes, a slow-motion capture mode, etc.). In some variants, capture settings may be based on intended post-processing effects.

In one embodiment, the capture settings may be different from the intended playback settings. Differences in capture and playback frame rates may allow certain effects to be added in post-processing (e.g., bokeh, stabilization). For example, the capture device may capture images with a greater depth of field to then add a shallow depth of field effect or chroma key in post-processing.

At step 1344, the capture device may capture video using the camera sensor 1310 with the capture settings. The capture device may perform processing of the captured images using the control and data subsystem including the ISP 1302. The video may be encoded using codec 1308. The capture device may capture sensor data using the sensor subsystem and store that capture data with the captured video. The data may include data about the pose (location/orientation) of the capture device when capturing the frame of video.

Other sensor data, e.g., LIDAR/RADAR data may be used to determine depth of objects in the frame. In some implementations, depth may be explicitly determined based on a depth sensor or derived from a stereo camera setup to aid in the generation of depth maps.

At step 1346, the capture device may perform post-processing on video. Post-processing may include generating depth maps, image/video stabilization, adding bokeh or chroma key effects, and scaling a video playback.

At step 1348, the capture device may transfer video. The captured video may be stored on internal or removable storage and transferred using wired or wireless mechanisms (via the network/data interface 1326) or via transferring the removable storage to another device (e.g., the post-processing device 1400).

While the foregoing actions are presented in the context of a capture device that capture video for generating and augmenting depth maps using sparse data, those of ordinary skill in the related arts will readily appreciate that the actions may be broadly extended to many different use cases (including, e.g., for performing other post-processing activities and sharing/viewing captured media).

Functional Overview of the Post-Processing Device

Functionally, a post-processing device refers to a device that can receive and process image/video data. The post-processing device has many similarities in operation and implementation to the capture device 1300 which are not further discussed; the following discussion provides a discussion of the internal operations, design considerations, and/or alternatives, that are specific to post-processing device operation. Additionally, certain actions performed by the post-processing device may be performed by the capture device 1300.

Figure 14:
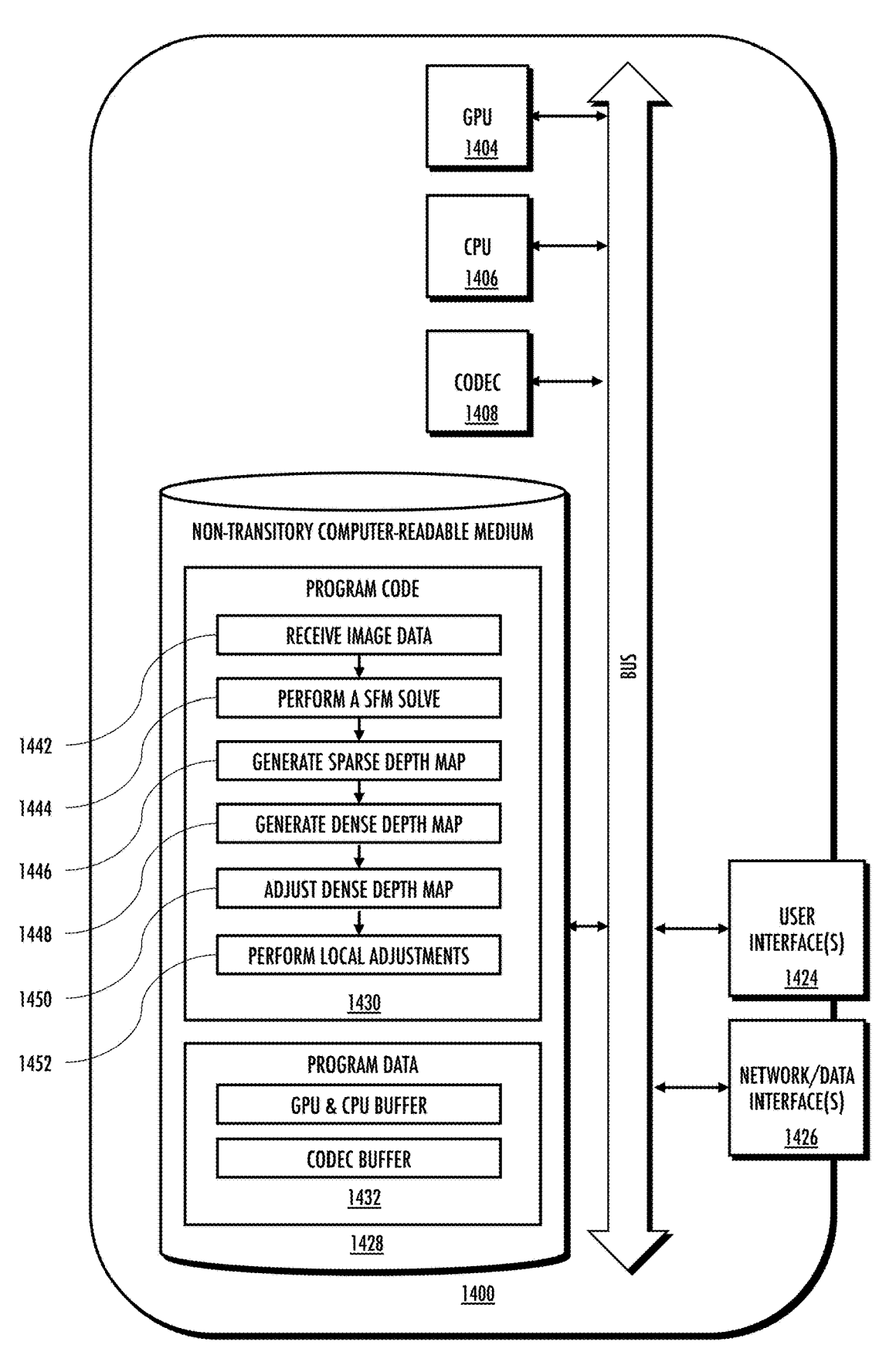
FIG. 14 is a logical block diagram of an exemplary post-processing device, in accordance with various aspects of the present disclosure.

FIG. 14 is a logical block diagram of an exemplary post-processing device 1400. The post-processing device 1400 includes: a user interface subsystem, a communication subsystem, a control and data subsystem, and a bus to enable data transfer. The following discussion provides a specific discussion of the internal operations, design considerations, and/or alternatives, for each subsystem of the exemplary post-processing device 1400.

Functional Overview of the User Interface Subsystem

Functionally, the user interface subsystem 1424 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1424 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

User Interface Subsystem Considerations for Different Device Types

The illustrated user interface subsystem 1424 may include user interfaces that are typical of the specific device types which include, but are not limited to: a desktop computer, a network server, a smart phone, and a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touchscreen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touchscreens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) In contrast, the data interfaces are configured to read/write data to a removeable non-transitory computer-readable medium (e.g., flash drive or similar memory media).

The illustrated network/data interface 1426 of the communication subsystem may include network interfaces including, but not limited to: Wi-Fi, Bluetooth, Global Positioning System (GPS), USB, and/or Ethernet network interfaces. Additionally, the network/data interface 1426 may include data interfaces such as: SD cards (and their derivatives) and/or any other optical/electrical/magnetic media (e.g., MMC cards, CDs, DVDs, tape, etc.)

Functional Overview of the Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 14, the control and data subsystem may include one or more of: a central processing unit (CPU 1406), a graphics processing unit (GPU 1404), a codec 1408, and a non-transitory computer-readable medium 1428 that stores program instructions (program code 1430) and/or program data 1432 (including a GPU buffer, a CPU buffer, and a codec buffer). In some examples, buffers may be shared between processing components to facilitate data transfer.

Generalized Operation of the Post-Processing Device

In one embodiment, the non-transitory computer-readable medium 1428 includes program code 1430 with instructions/a routine that performs post-processing, including adding motion blur to video. When executed by the control and data subsystem, the routine causes the post-processing device to: receive image data, determine optical flow on the video, generate motion vectors, generate intermediate frames, perform a vector blur, and stack the frames. These steps are discussed in greater detail below.

At step 1442, the post-processing device 1400 may receive video. In some embodiments, the video may be obtained via a removable storage media/a removable memory card or any network/data interface 1426. For instance, video from a capture device (e.g., capture device 1300) may be gathered by e.g., an internet server, a smartphone, a home computer, etc. and then transferred to the post-processing device via either wired or wireless transfer. The video may then be transferred to the non-transitory computer-readable medium 1428 for temporary storage during processing or for long term storage.

At step 1444, the post-processing device 1400 may perform a SfM solve on the video. The control and data subsystem may generate a 3D point cloud of depth information of a scene of the video. Sensor data saved with the video may be obtained to augment or create the point cloud. The SfM data may be cleaned to remove outlier points or for moving objects.

At step 1446, the post-processing device 1400 may generate a sparse depth map. The sparse depth map is associated with the frame of the video and is based on the SFM solve (at the location/orientation the frame was captured).

At step 1448, the post-processing device 1400 may generate a dense depth map. The dense depth map may be generated using a SIDE technique. A ML model-based SIDE technique may be used. For example, neural network processing/artificial intelligence may be used to address generating a dense depth map from a frame of video. Such processing may be performed by the CPU 1406 or using dedicated Neural Network Processing Unit (NPU) of the control and data subsystem for dedicated AI processing.

At step 1450, the post-processing device 1400 may adjust the dense depth map to conform to the values of the sparse depth map. In some examples, the differences between the values of equivalent (e.g., co-located) pixels/locations should be minimized. CPU 1406 or GPU 1404 may be used to process the depth adjustments.

At step 1452, the post-processing device 1400 may perform local adjustments to the adjusted depth map. The post-processing device 1400 may split the adjusted depth map into regions surrounding the sparse (SfM derived) pixel values. In one example, the frame is broken up into regions based on the locations of the SfM pixel values (in the sparse depth map). Local difference minimization may be performed in each region independently. The post-processing device 1400 may determine a local adjustment for each region. The adjustment may be based on the difference values between pixels in the region from the sparse depth map of SfM data and the adjusted dense depth map. A falloff amount or blend may be determined at the edges of the regions. In some examples, to not create distinct edges between regions, curve modifications from the coarse difference minimization may be blended or may fade between regions/SfM pixels to interpolate these curve differences between regions. A depth map modification layer may be created based on the local curves alterations and determined falloff/blend. The post-processing device 1400 may apply the determined adjustments (with the determined falloff) to the dense depth map. The application may apply the local adjustments to the coarse depth map to generate a local depth map.

While the foregoing discussion is presented in the context of a specific order, other ordered combinations may be substituted with equal success. For example, generating the dense depth map may be performed before the SFM solve or generating the sparse depth map. In still another alternative implementation, accurate sparse depth data is obtained from a sensor (RADAR/LIDAR) or from stereoscopic vision rather than an SfM solve and then is used to generate the sparse depth map.

Functional Overview of the Communication Network

As used herein, a communication network 1202 refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). Functionally, the communication network enables active participants (e.g., capture devices and/or post-processing devices) to communicate with one another.

Communication Networks, Implementation and Design Considerations

Aspects of the present disclosure may use an ad hoc communication network to, e.g., transfer data between the capture device 1300 and the post-processing device 1400. For example, USB or Bluetooth connections may be used to transfer data. Additionally, the capture device 1300 and the post-processing device 1400 may use more permanent communication network technologies (e.g., Bluetooth BR/EDR, Wi-Fi, 5G/6G cellular networks, etc.). For example, a capture device 1300 may use a Wi-Fi network (or other local area network) to transfer media (including video data) to a post-processing device 1400 (including e.g., a smart phone) or other device for processing and playback. In other examples, the capture device 1300 may use a cellular network to transfer media to a remote node over the Internet. These technologies are briefly discussed below.

So-called 5G cellular network standards are promulgated by the 3$^{rd}$ Generation Partnership Project (3GPP) consortium. The 3GPP consortium periodically publishes specifications that define network functionality for the various network components. For example, the 5G system architecture is defined in 3GPP TS 23.501 (*System Architecture for the 5G System* (*5GS*), version 17.5.0, published Jun. 15, 2022; incorporated herein by reference in its entirety). As another example, the packet protocol for mobility management and session management is described in 3GPP TS 24.501 (*Non-Access-Stratum* (*NAS*) *Protocol for 5G System* (*5G*); *Stage* 3, version 17.5.0, published Jan. 5, 2022; incorporated herein by reference in its entirety).

Currently, there are three main application areas for the enhanced capabilities of 5G. They are Enhanced Mobile Broadband (eMBB), Ultra Reliable Low Latency Communications (URLLC), and Massive Machine Type Communications (mMTC).

Enhanced Mobile Broadband (eMBB) uses 5G as a progression from 4G LTE mobile broadband services, with faster connections, higher throughput, and more capacity. eMBB is primarily targeted toward traditional "best effort" delivery (e.g., smart phones); in other words, the network does not provide any guarantee that data is delivered or that delivery meets any quality of service. In a best-effort network, all users obtain best-effort service such that the overall network is resource utilization is maximized. In these network slices, network performance characteristics such as network delay and packet loss depend on the current network traffic load and the network hardware capacity. When network load increases, this can lead to packet loss, retransmission, packet delay variation, and further network delay, or even timeout and session disconnect.

Ultra-Reliable Low-Latency Communications (URLLC) network slices are optimized for "mission critical" applications that require uninterrupted and robust data exchange. URLLC uses short-packet data transmissions which are easier to correct and faster to deliver. URLLC was originally envisioned to provide reliability and latency requirements to support real-time data processing requirements, which cannot be handled with best effort delivery.

Massive Machine-Type Communications (mMTC) was designed for Internet of Things (IoT) and Industrial Internet of Things (IIoT) applications. mMTC provides high connection density and ultra-energy efficiency. mMTC allows a single GNB to service many different devices with relatively low data requirements.

Wi-Fi is a family of wireless network protocols based on the IEEE 802.11 family of standards. Like Bluetooth, Wi-Fi operates in the unlicensed ISM band, and thus Wi-Fi and Bluetooth are frequently bundled together. Wi-Fi also uses a time-division multiplexed access scheme. Medium access is managed with carrier sense multiple access with collision avoidance (CSMA/CA). Under CSMA/CA. During Wi-Fi operation, stations attempt to avoid collisions by beginning transmission only after the channel is sensed to be "idle"; unfortunately, signal propagation delays prevent perfect channel sensing. Collisions occur when a station receives multiple signals on a channel at the same time and are largely inevitable. This corrupts the transmitted data and can require stations to re-transmit. Even though collisions prevent efficient bandwidth usage, the simple protocol and low cost has greatly contributed to its popularity. As a practical matter, Wi-Fi access points have a usable range of ~50 ft indoors and are mostly used for local area networking in best-effort, high throughput applications.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method of generating a depth map, comprising:
generating a first depth map of a frame of a video using a first technique;
generating a second depth map of the frame of the video using a second technique;
adjusting the second depth map based on the first depth map; and
performing local re-mapping of second depth values of the second depth map comprising:
determining depth map regions in the second depth map;
determining local adjustments for each of the depth map regions; and
applying the local adjustments to the second depth map.

2. The method of claim 1, further comprising:
generating a three-dimensional (3D) point cloud, where generating the first depth map is based on the 3D point cloud.

3. The method of claim 2, where generating the 3D point cloud comprises performing a structure-from-motion solve on the video.

4. The method of claim 1, where the first technique is a single-image depth estimation technique.

5. The method of claim 1, where:
the first depth map is a sparse depth map, and
the second depth map is a dense depth map, the sparse depth map having fewer depth values in the depth map than the dense depth map.

6. The method of claim 1, where adjusting the second depth map comprises shifting second depth values of the second depth map to minimize a difference of the second depth values of the second depth map and co-located first depth values of the first depth map.

7. The method of claim 1, where adjusting the second depth map based on the first depth map comprises re-mapping depth values in the second depth map to fit co-located depth values in the first depth map.

8. The method of claim 1, where adjusting the second depth map based on the first depth map comprises re-mapping the second depth values of the second depth map based on first depth values of the first depth map.

9. The method of claim 1, where:
adjusting the second depth map based on the first depth map produces an adjusted second depth map with adjusted second depth values, and
determining the local adjustments comprises determining a difference between the adjusted second depth values and co-located first depth values of the first depth map.

10. The method of claim 1, where determining the depth map regions in the second depth map is based on pixel locations in the first depth map.

11. A post-processing device, comprising:
a processor; and
a non-transitory computer-readable medium comprising a set of instructions that, when executed by the processor, causes the processor to:
receive a video;
generate a sparse depth map for a frame of the video;
generate a dense depth map for the frame of the video;
adjust first depth values of the dense depth map based on second depth values of the sparse depth map generating an adjusted dense depth map;
determine differences between third depth values of the adjusted dense depth map and second depth values of the sparse depth map;
determining local adjustments corresponding to a plurality of regions of the adjusted dense depth map based on the differences; and
applying the local adjustments to the adjusted dense depth map.

12. The post-processing device of claim 11, where the set of instructions further causes the processor to generate a 3D point cloud based on a plurality of frames of the video, the 3D point cloud being used to generate the sparse depth map for the frame of the video.

13. The post-processing device of claim 12, where the set of instructions further causes the processor to refine the 3D point cloud by removing outlier values.

14. The post-processing device of claim 12, where the set of instructions further causes the processor to:
determine objects in the 3D point cloud; and
refine the 3D point cloud by removing moving objects from the 3D point cloud.

15. The post-processing device of claim 11, where the video comprises a plurality of frames and each of the plurality of frames is associated with capture metadata comprising at least one of capture location metadata and capture orientation metadata.

16. The post-processing device of claim 15, where the set of instructions further causes the processor to generate a 3D point cloud based on the plurality of frames of the video and the capture metadata, the 3D point cloud being used to generate the sparse depth map for the frame of the video.

17. The post-processing device of claim 11, where the set of instructions further causes the processor to perform a structure-from-motion analysis on at least a portion of the video, where generating the sparse depth map is based on the structure-from-motion analysis.

18. A method of post-processing video, comprising:

receiving a video;

generating a three-dimensional (3D) point cloud corresponding to depths of objects in a plurality of frames of the video using a structure-from-motion technique;

generating a sparse depth map for a frame of the plurality of frames of the video based on the 3D point cloud;

generating a dense depth map for the frame of the video based on a single-image depth estimation technique;

adjusting the dense depth map based on minimizing depth differences between the dense depth map and the sparse depth map creating an adjusted dense depth map;

determining differences between first depth values of the adjusted dense depth map and second depth values of the sparse depth map;

determining local adjustments corresponding to a plurality of regions of the adjusted dense depth map based on the differences; and applying the local adjustments to the adjusted dense depth map.

19. The method of claim 18, where:

the sparse depth map comprises first depth values corresponding to a first number of pixel locations of the frame of the video, the dense depth map comprises second depth values corresponding to a second number of pixel locations of the frame of the video, and the second number of pixel locations is greater than the first number of pixel locations.

20. The method of claim 18, further comprising determining the plurality of regions of the adjusted dense depth map based on pixel locations in the sparse depth map.

* * * * *